(12) United States Patent
Kawate et al.

(10) Patent No.: US 11,578,648 B2
(45) Date of Patent: Feb. 14, 2023

(54) CRANKSHAFT

(71) Applicant: TOYOTA JIDOSHA KABUSHIKI KAISHA, Aichi-ken (JP)

(72) Inventors: Taiki Kawate, Susono (JP); Kazuhito Sakai, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/578,483

(22) Filed: Jan. 19, 2022

(65) Prior Publication Data

US 2022/0228528 A1 Jul. 21, 2022

(30) Foreign Application Priority Data

Jan. 20, 2021 (JP) .............................. JP2021-006812

(51) Int. Cl.
*F02B 75/18* (2006.01)
*F16C 3/08* (2006.01)
*F16C 3/22* (2006.01)

(52) U.S. Cl.
CPC ................ *F02B 75/18* (2013.01); *F16C 3/08* (2013.01); *F16C 3/22* (2013.01)

(58) Field of Classification Search
CPC ............ F02B 75/18; F02B 75/10; F16C 3/08; F16C 3/22
See application file for complete search history.

(56) References Cited

U.S. PATENT DOCUMENTS

| | | | | |
|---|---|---|---|---|
| 5,481,942 A | * | 1/1996 | Baek | ...................... F16F 15/283 |
| | | | | 74/595 |
| 2010/0139606 A1 | * | 6/2010 | Yorita | ................ F01M 11/0004 |
| | | | | 123/196 R |
| 2016/0169322 A1 | * | 6/2016 | Ono | ....................... F16F 15/283 |
| | | | | 74/603 |
| 2017/0173664 A1 | * | 6/2017 | Okubo | ...................... F16C 3/08 |
| 2018/0071813 A1 | * | 3/2018 | Okubo | ..................... B21J 5/022 |
| 2018/0071814 A1 | * | 3/2018 | Okubo | ..................... B21K 1/08 |
| 2019/0040932 A1 | * | 2/2019 | Imano | .................. F16F 15/283 |
| 2019/0217372 A1 | * | 7/2019 | Okubo | .................. B21J 13/025 |
| 2019/0224741 A1 | * | 7/2019 | Okubo | ....................... F16C 3/08 |
| 2020/0101521 A1 | * | 4/2020 | Tamura | ...................... F16C 3/08 |

FOREIGN PATENT DOCUMENTS

JP 2012247043 A 12/2012

* cited by examiner

*Primary Examiner* — Long T Tran
(74) *Attorney, Agent, or Firm* — Hauptman Ham, LLP

(57) ABSTRACT

A crankshaft in which vibrations can be damped effectively without changing a design of a crankcase. The crankshaft comprises a first crank section located at one end of the crankshaft, and a second crank section located at the other end of the crankshaft. In the first crank section, a mass of a first inner balance weight is greater than a mass of a first outer balance weight. In the second crank section, a mass of a second inner balance weight is greater than a mass of a second outer balance weight.

15 Claims, 4 Drawing Sheets

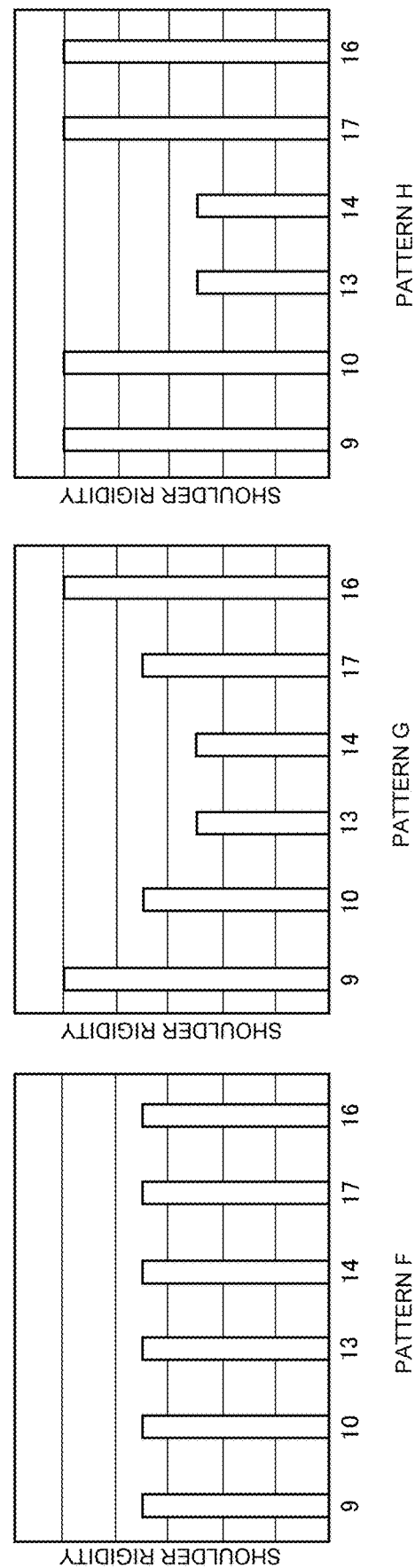

CRANKSHAFT

The present disclosure claims the benefit of Japanese Patent Application No. 2021-006812 filed on Jan. 20, 2021 with the Japanese Patent Office, the disclosure of which is incorporated herein by reference in its entirety.

BACKGROUND

Field of the Disclosure

Embodiment of the present disclosure relates to the art of a crankshaft in which a series of cranks are arranged in an axial direction.

Discussion of the Related Art

JP-A-2012-247043 describes a crankshaft adapted to be arranged in a straight-three engine. According to the teachings of JP-A-2012-247043, in order to prevent the engine from growing in size, first and third cylinders are individually provided with a balance weight counteracting inertial forces of a piston of a second cylinder and a connecting rod connecting the piston and a crank pin. In the crankshaft taught by JP-A-2012-247043, specifically, a thickness of each crank web of a second pair arranged on both sides of the second cylinder is thinner than thicknesses of crank webs of a first pair arranged on both sides of the first cylinder and crank webs of a third pair arranged on both sides of the third cylinder. In the crankshaft taught by JP-A-2012-247043, therefore, a distance between outer surfaces of the crank webs of the second pair is shorter than distances between outer surfaces of the crank webs of the first pair and between outer surfaces of the crank webs of the third pair. That is, according to the teachings of JP-A-2012-247043, an increase in a length of the crankshaft and an increase in a distance from a rotational center of the crankshaft to an outer edge of the crank webs are prevented by changing the thicknesses of the crank webs. Further, the balance weights counteracting the inertial force of the second cylinder are allowed be arranged on the first and third cylinders.

In addition, in the first pair of the crank webs described in JP-A-2012-247043, rigidity of the second crank web situated axially inner side of the first crank web is increased higher than rigidity of the first crank web by increasing the thickness of the second crank web thicker than the thickness of the first crank web. Likewise, in the third pair of the crank webs described in JP-A-2012-247043, rigidity of the fifth crank web situated axially inner side of the sixth crank web is increased higher than rigidity of the sixth crank web by increasing the thickness of the fifth crank web thicker than the thickness of the sixth crank web.

Thus, in the crankshaft taught by JP-A-2012-247043, the first and third cylinders are individually provided with the balance weight counteracting the inertial forces of the piston of the second cylinder and the connecting rod connecting the piston and the crank pin. According to the teachings of JP-A-2012-247043, therefore, an increase in the length of the crankshaft can be prevented while ensuring vibration damping performance comparable to that of the crankshaft in which a balance weight is arranged in the second cylinder. However, in order to improve vibration damping performance of the conventional crankshaft in which the second pairs of crank webs are provided with the balance weights, arrangements of the balance weights of the first and third pairs of crank webs and rigidities of the crank arms and the crank pins have to be improved.

SUMMARY

Aspects of embodiments of the present disclosure have been conceived noting the foregoing technical problems, and it is therefore an object of the present disclosure to effectively damp vibrations on a crankshaft.

An exemplary embodiment of the present disclosure relates to a crankshaft, comprising: a plurality of crank sections arranged along a rotational axis of the crankshaft including a first crank section located at one end of the crankshaft, a second crank section located at the other end of the crankshaft, and an intermediate crank section located between the first crank section and the second crank section. Each of the crank sections comprises: a pair of crank arms being opposed to each other; and a crank pin connecting radially outermost portions of the crank arms such that the crank section rotates around the rotational axis of the crankshaft extending parallel to a center axis of the crank pin. Specifically, the first crank section comprises a first pair of crank arms, a first crank pin connecting the first pair of crank arms, and a first pair of balance weights individually counteracting an inertial force acting on the first crank pin. The first pair of crank arms includes a first outer crank arm located at an axially outer side, and a first inner crank arm located at an axially inner side. The first pair of balance weights includes: a first outer balance weight joined to the first outer crank arm to be situated on an opposite side of the first outer crank arm across the rotational axis; and a first inner balance weight joined to the first inner crank arm to be situated on an opposite side of the first inner crank arm across the rotational axis. The second crank section comprises a second pair of crank arms, a second crank pin connecting the second pair of crank arms and a second pair of balance weights individually counteracting an inertial force acting on the second crank pin. The second pair of crank arms includes a second outer crank arm located at an axially outer side, and a second inner crank arm located at an axially inner side. The second pair of balance weights includes: a second outer balance weight joined to the second outer crank arm to be situated on an opposite side of the second outer crank arm across the rotational axis; and a second inner balance weight joined to the second inner crank arm to be situated on an opposite side of the second inner crank arm across the rotational axis. The intermediate crank section comprises a pair of intermediate crank arms, and an intermediate crank pin connecting the intermediate crank arms. In order to achieve the above-explained objective, according to the exemplary embodiment of the present disclosure, a mass of the first inner balance weight is greater than a mass of the first outer balance weight, and a mass of the second inner balance weight is greater than a mass of the second outer balance weight. Alternatively or in addition, a rigidity of a first joining section of the first outer crank arm to which the first crank pin is connected and a rigidity of a second joining section of the second outer crank arm to which the second crank pin is connected are higher than rigidities of joining sections of the intermediate crank arms to which the intermediate crank pin is connected.

In a non-limiting embodiment, the first inner balance weight and the first outer balance weight may be individually shaped into a plate shape. In addition, an area of the first outer balance weight along a plane perpendicular to the rotational axis may be smaller than an area of the first inner balance weight along the plane perpendicular to the rotational axis.

In a non-limiting embodiment, the first inner balance weight and the first outer balance weight may be individually shaped into a sector form. In addition, an arc length of the first outer balance weight in a rotational direction of the first crank section may be shorter than an arc length of the first inner balance weight in the rotational direction of the first crank section.

In a non-limiting embodiment, a central angle of the first inner balance weight may be wider than a central angle of the first outer balance weight.

In a non-limiting embodiment, a length of the first outer balance weight between the rotational axis and a farthest portion from the rotational axis may be shorter than a length of the first inner balance weight between the rotational axis and a farthest portion from the rotational axis.

In a non-limiting embodiment, the first inner balance weight and the first outer balance weight may be individually shaped into a sector form. In addition, a radius of the first inner balance weight may be longer than a radius of the first outer balance weight.

In a non-limiting embodiment, the second inner balance weight and the second outer balance weight may be individually shaped into a plate shape. In addition, an area of the second outer balance weight along a plane perpendicular to the rotational axis may be smaller than an area of the second inner balance weight along the plane perpendicular to the rotational axis.

In a non-limiting embodiment, the second inner balance weight and the second outer balance weight may be individually shaped into a sector form. In addition, an arc length of the second outer balance weight in the rotational direction of the second crank section may be shorter than an arc length of the second inner balance weight in a rotational direction of the second crank section.

In a non-limiting embodiment, a central angle of the second inner balance weight may be wider than a central angle of the second outer balance weight.

In a non-limiting embodiment, a length of the second outer balance weight between the rotational axis and a farthest portion from the rotational axis may be shorter than a length of the second inner balance weight between the rotational axis and a farthest portion from the rotational axis.

In a non-limiting embodiment, the second inner balance weight and the second outer balance weight may be individually shaped into a sector form. In addition, a radius of the second inner balance weight may be longer than a radius of the second outer balance weight.

In a non-limiting embodiment, the rigidity of the first joining section of the first outer crank arm may be higher than a rigidity of a third joining section of the first inner crank arm to which the first crank pin is connected. Likewise, the rigidity of the second joining section of the second outer crank arm may be higher than a rigidity of a fourth joining section of the second inner crank arm to which the second crank pin is connected.

In a non-limiting embodiment, the rigidities of the third joining section and the fourth joining section may be higher than the rigidities of the joining sections of the intermediate crank arms to which the intermediate crank pin is connected.

In a non-limiting embodiment, thicknesses of the first joining section and the second joining section may be thicker than thicknesses of the joining sections of the intermediate crank arms to which the intermediate crank pin is connected.

In a non-limiting embodiment, the rigidity may include at least one of a rigidity of the crank arm in a vertical direction and a rigidity of the crank arm in a horizontal direction.

In a non-limiting embodiment, widths of the first crank section, the second crank section, and the intermediate crank section in an axial direction may be identical to one another.

Thus, in the crankshaft according to the exemplary embodiment of the present disclosure, the first outer balance weight is joined to the first outer crank arm, and the first inner balance weight is joined to the first inner crank arm. Likewise, the second outer balance weight is joined to the second outer crank arm, and the second inner balance weight is joined to the second inner crank arm. As described, a mass of the first inner balance weight is greater than a mass of the first outer balance weight, and a mass of the second inner balance weight is greater than a mass of the second outer balance weight. According to the exemplary embodiment of the present disclosure, therefore, vibrations on the crankshaft may be damped more effectively compared to conventional crankshafts in which masses of an axially inner balance weight and an axially outer balance weight are identical to each other. Alternatively or in addition, a rigidity of the first joining section of the first outer crank arm and a rigidity of the second joining section of the second outer crank arm are higher than rigidities of the joining sections of the intermediate crank arms. In this case, the vibrations on the crankshaft may also be damped more effectively compared to conventional crankshafts in which rigidity of all of joining sections between the crank arms and the crank pins are identical to one another. In addition, the masses of the first inner balance weight and the second inner balance weight are increased greater than the masses of the first outer balance weight and the second outer balance weight without changing thicknesses of those balance weights. Likewise, the rigidities of the first joining section and the second joining section are increased higher than those of other joining sections without changing thicknesses of those joining sections. According to the exemplary embodiment of the present disclosure, therefore, positions of journals may be maintained to designed positions, and a length of the crankshaft will not be changed from a designed value. For this reason, it is not necessary to change a design of a crankcase to hold the crankshaft.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 4 is a graph indicating rigidities of crank arms in simulated patterns.

DETAILED DESCRIPTION OF THE PREFERRED EMBODIMENT(S)

Figure 1:
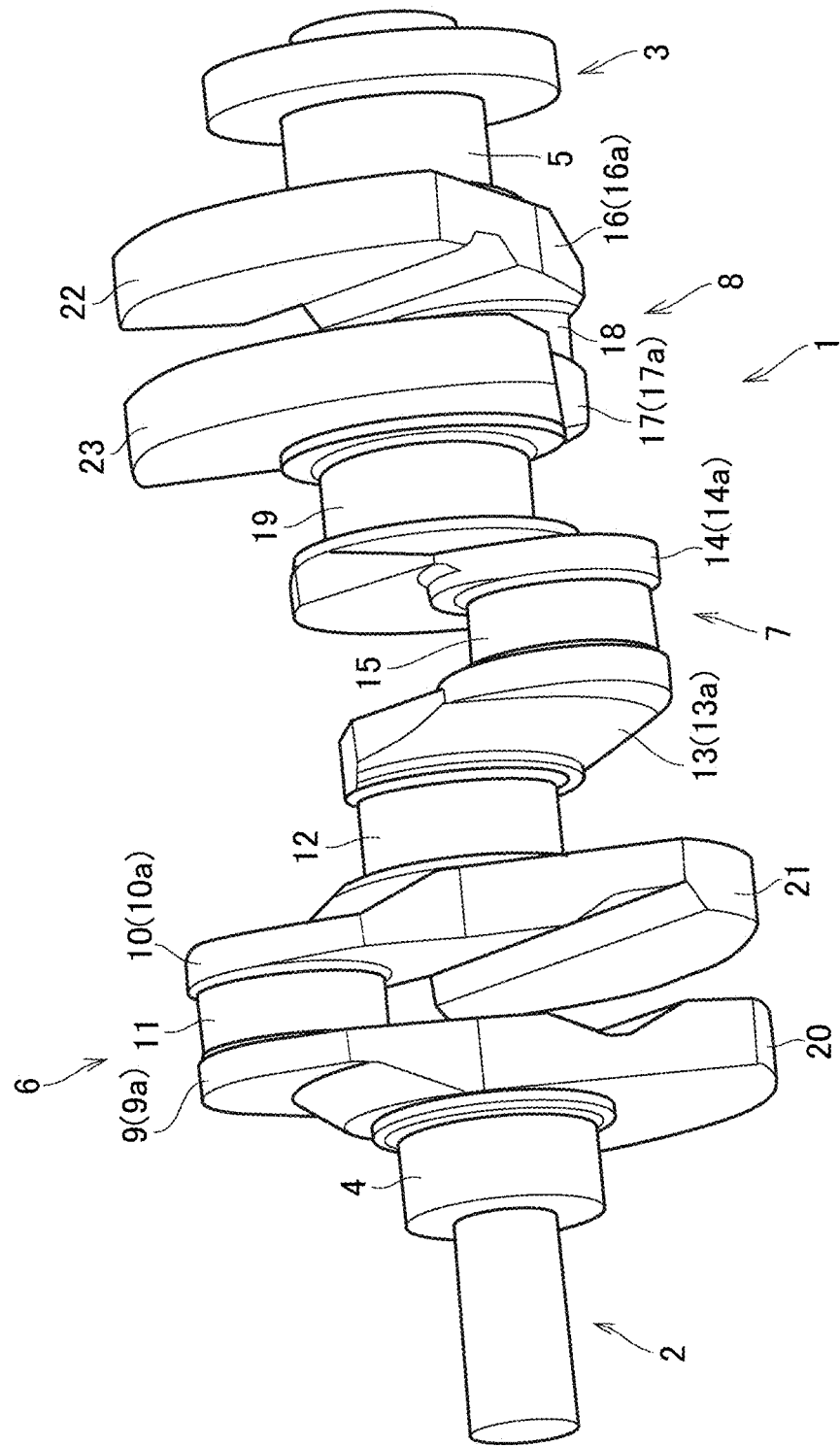
FIG. 1 is a perspective view showing a structure of the crankshaft according to the exemplary embodiment of the present disclosure.

An exemplary embodiment of the present disclosure will now be explained with reference to the accompanying drawings. Turning now to FIG. 1, there is shown a structure of a crankshaft 1 according to the exemplary embodiment of the present disclosure. In an engine block, pistons are reciprocated by burning air/fuel mixture, and the crankshaft 1 translates reciprocating motion of the pistons into rotational motion. That is, a load to reciprocate the pistons is applied to the crankshaft 1, and the crankshaft 1 translate the load into a torque.

The crankshaft 1 comprises an output section 2 that outputs the torque thus translated from the load of the pistons, and a rear end section 3 supporting a rear end of the crankshaft 1. The output section 2 and the rear end section 3 are aligned along a common rotational axis while being supported by a crankcase (not shown) in a rotatable manner. Specifically, the output section 2 includes a front journal 4 and the rear end section 3 includes a rear journal 5, and the front journal 4 and the rear journal 5 are supported by the crankcase.

The crankshaft 1 shown in FIG. 1 is adapted to be employed in a straight-three internal combustion engine. To this end, the crankshaft 1 is provided with a front crank section 6 as a first crank section, an intermediate crank section 7, and a rear crank section 8 as a second crank section aligned with one another to rotated around the rotational axis.

The front crank section 6 connected to the output section 2 comprises a first pair of crank arms including a first outer crank arm 9 and a first inner crank arm 10 being opposed to each other, and a front crank pin 11 as a first crank pin connecting the first outer crank arm 9 to the first inner crank arm 10.

Specifically, an axially outer surface of the first outer crank arm 9 is connected to the front journal 4 of the output section 2, and the first outer crank arm 9 has a predetermined length in a radial direction between the rotational axis and a radially outermost portion thereof. The first inner crank arm 10 is opposed to an axially inner surface of the first outer crank arm 9, and the front crank pin 11 is interposed between the first outer crank arm 9 and the first inner crank arm 10 in such a manner that a center axis of the front crank pin 11 extends parallel to the rotational axis. That is, an axially outer end of the front crank pin 11 is connected to a first joining section 9a located at a radially outer portion of the axially inner surface of the first outer crank arm 9, and an axially inner end of the front crank pin 11 is connected to a third joining section 10a located at a radially outer portion of an axially outer surface of the first inner crank arm 10.

An axially inner surface of the first inner crank arm 10 is connected to an axially outer end of a first journal 12 extending around the rotational axis while being supported by the crankcase. Whereas, an axially inner end of the first journal 12 is connected to the intermediate crank section 7.

The intermediate crank section 7 comprises a pair of intermediate crank arms including a first intermediate crank arm 13 and a second intermediate crank arm 14 being opposed to each other, and an intermediate crank pin 15 connecting the first intermediate crank arm 13 to the second intermediate crank arm 14.

Specifically, an axially outer surface of the first intermediate crank arm 13 is connected to the first journal 12, and the first intermediate crank arm 13 has a predetermined length in a radial direction between the rotational axis and a radially outermost portion thereof. The second intermediate crank arm 14 is opposed to an axially inner surface of the first intermediate crank arm 13, and the intermediate crank pin 15 is interposed between the first intermediate crank arm 13 and the second intermediate crank arm 14 in such a manner that a center axis of the intermediate crank pin 15 extends parallel to the rotational axis. That is, a front end of the intermediate crank pin 15 is connected to a joining section 13a located at a radially outer portion of the axially inner surface of the first intermediate crank arm 13, and a rear end of the intermediate crank pin 15 is connected to a joining section 14a located at a radially outer portion of an axially inner surface of the second intermediate crank arm 14.

The rear crank section 8 connected to the rear end section 3 comprises a second pair of crank arms including a second outer crank arm 16 and a second inner crank arm 17 being opposed to each other, and a rear crank pin 18 as a second crank pin connecting the second outer crank arm 16 to the second inner crank arm 17.

Specifically, an axially outer surface of the second outer crank arm 16 is connected to the rear journal 5 of the rear end section 3, and the second outer crank arm 16 has a predetermined length in a radial direction between the rotational axis and a radially outermost portion thereof. The second inner crank arm 17 is opposed to an axially inner surface of the second outer crank arm 16, and the rear crank pin 18 is interposed between the second outer crank arm 16 and the second inner crank arm 17 in such a manner that a center axis of the rear crank pin 18 extends parallel to the rotational axis. That is, an axially outer end of the rear crank pin 18 is connected to a second joining section 16a located at a radially outer portion of the axially inner surface of the second outer crank arm 16, and an axially inner end of the rear crank pin 18 is connected to a fourth joining section 17a located at a radially outer portion of an axially outer surface of the second inner crank arm 17.

An axially inner surface of the second inner crank arm 17 is connected to an axially outer surface of the second intermediate crank arm 14 though a second journal 19 held by the crankcase in a rotatable manner.

In the crankshaft 1, phases of the front crank section 6, the intermediate crank section 7, and the rear crank section 8 are shifted from one another by approximately 120 degrees each in a rotational direction.

In order to damp vibrations derived from rotations of the front crank pin 11, the intermediate crank pin 15, and the rear crank pin 18, in other words, in order to establish an inertial force counteracting inertial forces acting on the front crank pin 11, the intermediate crank pin 15, and the rear crank pin 18, the crankshaft 1 is provided with balance weights as plate members. That is, the front crank section 6 further comprises a first pair of balance weights including a first outer balance weight 20 and a first inner balance weight 21, and the rear crank section 8 further comprises a second pair of balance weights including a second outer balance weight 22 and a second inner balance weight 23.

Specifically, the first outer balance weight 20 is joined to the first outer crank arm 9 across the rotational axis so that first outer balance weight 20 is situated on the opposite side of the first outer crank arm 9 across the rotational axis, and the first inner balance weight 21 is joined to the first inner crank arm 10 across the rotational axis so that the first inner balance weight 21 is situated on the opposite side of the first inner crank arm 10 across the rotational axis. Likewise, the second outer balance weight 22 is joined to the second outer crank arm 16 across the rotational axis so that second outer balance weight 22 is situated on the opposite side of the second outer crank arm 16 across the rotational axis, and the second inner balance weight 23 is joined to the second inner crank arm 17 across the rotational axis so that second inner balance weight 23 is situated on the opposite side of the second inner crank arm 17 across the rotational axis.

However, the balance weight is not arranged in the intermediate crank section 7. That is, a total mass of the first outer balance weight 20, the first inner balance weight 21, the second outer balance weight 22, and the second inner balance weight 23 includes a required mass to damp vibrations derived from rotation of the intermediate crank pin 15 of the intermediate crank section 7. Specifically, a total mass of the first outer balance weight 20 and the first inner balance weight 21 includes: a mass required to damp vibrations derived from rotations of the front crank pin 11; and a part of the required mass to damp vibrations derived from rotation of the intermediate crank pin 15. Whereas, a total mass of the second outer balance weight 22 and the second inner balance weight 23 includes: a mass required to damp vibrations derived from rotations of the rear crank pin 18; and the remaining part of the required mass to damp vibrations derived from rotation of the intermediate crank pin 15. Given that the balance weights are arranged in the intermediate crank section 7, as well known in the prior art, the total mass of the first outer balance weight 20 and the first inner balance weight 21 and the total mass of the second outer balance weight 22 and the second inner balance weight 23 may be smaller than the total mass of the balance weights arranged in the intermediate crank section 7.

In the front crank section 6, masses of the first outer balance weight 20 and the first inner balance weight 21 may be not only identical to each other but also different from each other. Likewise, in the rear crank section 8, masses of the second outer balance weight 22 and the second inner balance weight 23 may be not only identical to each other but also different from each other. In order to effectively damp the vibrations on the crankshaft 1, the inventors of the present disclosure conducted a simulation to find optimum masses of the first outer balance weight 20, the first inner balance weight 21, the second outer balance weight 22, and the second inner balance weight 23.

Figure 2:
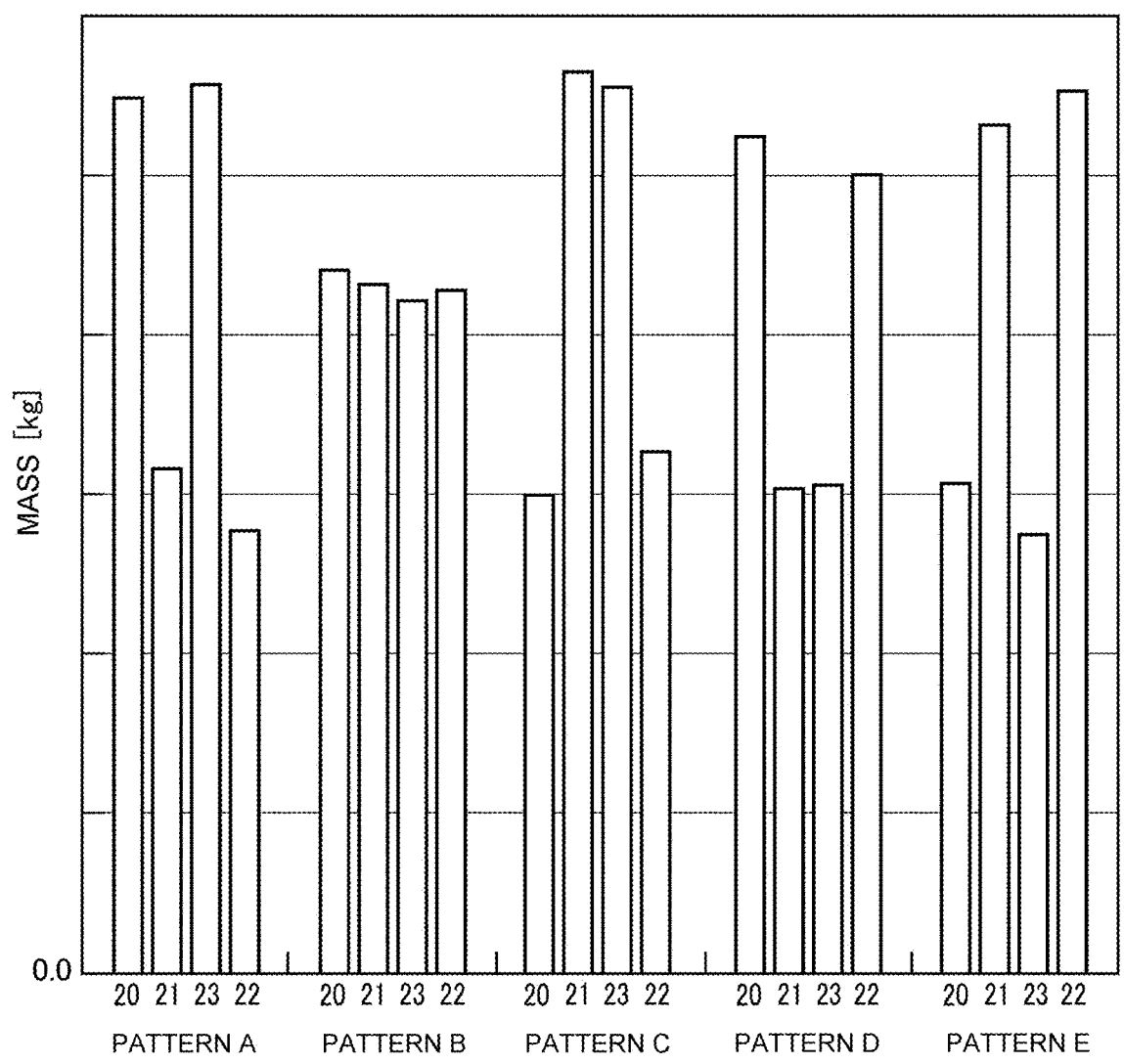
FIG. 2 is a graph indicating masses of balance weights in simulated patterns.

In the simulation, masses of the balance weights 20, 21, 22, and 23 were adjusted in patterns A to E shown in FIG. 2. Specifically, in the pattern A, masses of the first pair of the first outer balance weight 20 and the first inner balance weight 21 were adjusted such that a mass of the first outer balance weight 20 was greater than a mass of the first inner balance weight 21, and masses of a second pair of the second outer balance weight 22 and the second inner balance weight 23 were adjusted such that a mass of the second outer balance weight 22 was smaller than a mass of the second inner balance weight 23. In the pattern B, masses of the first outer balance weight 20, the first inner balance weight 21, the second outer balance weight 22, and the second inner balance weight 23 were adjusted to be equal to one another. In the pattern C, masses of the first pair of the first outer balance weight 20 and the first inner balance weight 21 were adjusted such that a mass of the first outer balance weight 20 was smaller than a mass of the first inner balance weight 21, and masses of the second pair of the second outer balance weight 22 and the second inner balance weight 23 were adjusted such that a mass of the second outer balance weight 22 was smaller than a mass of the second inner balance weight 23. In the pattern D, masses of the first pair of the first outer balance weight 20 and the first inner balance weight 21 were adjusted such that a mass of the first outer balance weight 20 was greater than a mass of the first inner balance weight 21, and masses of the second pair of the second outer balance weight 22 and the second inner balance weight 23 were adjusted such that a mass of the second outer balance weight 22 was greater than a mass of the second inner balance weight 23. In the pattern E, masses of the first pair of the first outer balance weight 20 and the first inner balance weight 21 were adjusted such that a mass of the first outer balance weight 20 was smaller than a mass of the first inner balance weight 21, and masses of the second pair of the second outer balance weight 22 and the second inner balance weight 23 were adjusted such that a mass of the second outer balance weight 22 was greater than a mass of the second inner balance weight 23.

The simulation is conducted on the basis that the crankshaft 1 rotates at a same speed while maintaining an engine load to a constant value in all of the above-mentioned patterns. In the above-mentioned conditions, vibration levels of the front journal 4, the first journal 12, the second journal 19, and the rear journal 5, and an average value of those vibration levels are simulated within a range of frequency between 600 Hz and 1600 Hz.

Simulated vibration levels in the patterns B to E and an average value of the simulated vibration levels in the patterns B to E compared to simulated vibration levels in the pattern A are shown in Table 1.

TABLE 1

| | Vibration Levels (Compared to the pattern A) | | | |
|---|---|---|---|---|
| Pattern | B | C | D | E |
| Front Journal | −0.084 | −0.408 | 0.253 | −0.241 |
| First Journal | 0.032 | −0.106 | 0.186 | 0.094 |
| Second Journal | −0.018 | −0.029 | 0.021 | −0.067 |
| Rear Journal | 0.092 | −0.116 | 0.258 | 0.346 |
| Average Value | 0.010 | −0.116 | 0.156 | 0.028 |

Unit: dB

As can be seen from Table 1, the vibrations on the front journal 4, the first journal 12, the second journal 19, and the rear journal 5 can be reduced most effectively in the pattern C. That is, vibrations on the crankshaft 1 can be damped most effectively by adjusting the mass of the first outer balance weight 20 smaller than the mass of the first inner balance weight 21, and adjusting the mass of the second outer balance weight 22 smaller than the mass of the second inner balance weight 23.

Based on the simulated values in the patterns C and D, a load acted on the front journal 4 in the pattern C and a load acted on the front journal 4 in the pattern D were compared to a load acted on the front journal 4 in the pattern A. Specifically, average values of levels of loads acted on the front journal 4 in a reciprocating direction of the pistons (i.e., in the vertical direction) and in a direction perpendicular to the reciprocating direction of the pistons (i.e., in the horizontal direction) in the pattern C: and average values of levels of loads acted on the front journal 4 in the vertical direction and in the horizontal direction in the pattern D; were individually compared to average values of levels of loads acted on the front journal 4 in the vertical direction and in the horizontal direction in the pattern A. A comparison result is shown in Table 2.

TABLE 2

| Pattern | Load Levels (Compared to the pattern A) | |
| --- | --- | --- |
|  | C | D |
| Vertical Load | −1.75 | −0.20 |
| Horizontal Load | −3.77 | 0.12 |

Unit: dB

As can be seen from Table 2, the loads acted on the front journal 4 in the pattern C is smaller than the loads acted on the front journal 4 in the pattern D. That is, the vibrations on the crankshaft 1 can be damped more effectively in the pattern C.

In the crankshaft 1 according to the exemplary embodiment of the present disclosure, therefore, a mass of the first outer balance weight 20 is adjusted to be smaller than a mass of the first inner balance weight 21, and a mass of the second outer balance weight 22 is adjusted to be smaller than a mass of the second inner balance weight 23. Specifically, an area of the first outer balance weight 20 along a plane perpendicular to the rotational axis is reduced smaller than an area of the first inner balance weight 21 along the plane perpendicular to the rotational axis, and an area of the second outer balance weight 22 along the plane perpendicular to the rotational axis is reduced smaller than an area of the second inner balance weight 23 along the plane perpendicular to the rotational axis.

Figure 3:
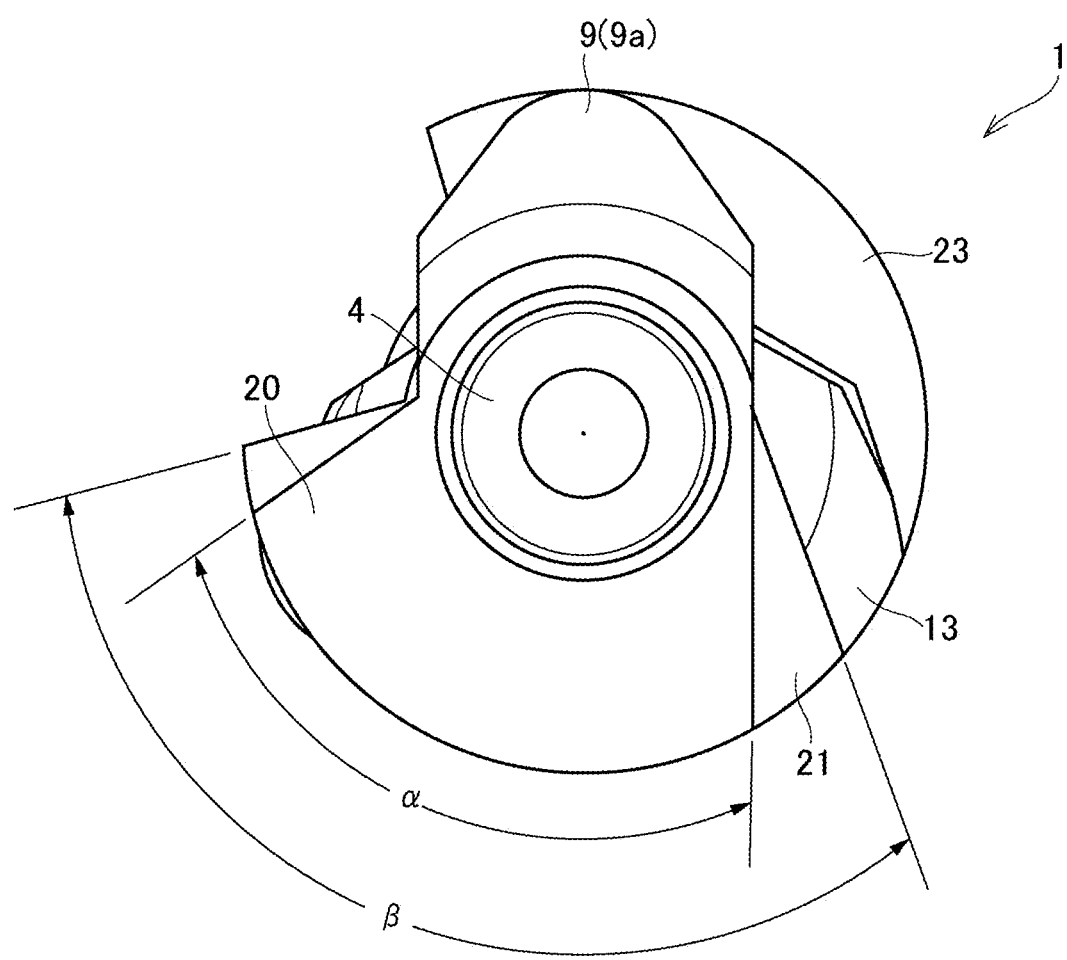
FIG. 3 is a side view showing configurations of the crankshaft shown in FIG. 1 viewed from an output section in the axial direction.

Turning to FIG. 3, there is shown a configuration of the crankshaft 1 viewed from the output section 2 in the axial direction. As illustrated in FIG. 3, the first outer balance weight 20 and the first inner balance weight 21 are individually shaped into a sector form, but a central angle α of the first outer balance weight 20 is narrower than a central angle β of the first inner balance weight 21. That is, an arc length of the first outer balance weight 20 in the rotational direction of the front crank section 6 is shorter than an arc length of the first inner balance weight 21 in the rotational direction of the front crank section 6. Accordingly, the area of the first outer balance weight 20 along the plane perpendicular to the rotational axis is smaller than the area of the first inner balance weight 21 along the plane perpendicular to the rotational axis. Here, in the example shown in FIG. 3, thicknesses of the first outer balance weight 20 and the first inner balance weight 21 are substantially identical to each other.

Likewise, the second outer balance weight 22 and the second inner balance weight 23 are individually shaped into a sector form, but a central angle of the second outer balance weight 22 is narrower than a central angle of the second inner balance weight 23. That is, an arc length of the second outer balance weight 22 in the rotational direction of the rear crank section 8 is shorter than an arc length of the second inner balance weight 23 in the rotational direction of the rear crank section 8. Accordingly, the area of the second outer balance weight 22 along the plane perpendicular to the rotational axis is smaller than the area of the second inner balance weight 23 along the plane perpendicular to the rotational axis.

In the axial direction of the crankshaft 1, widths of the front crank section 6 and the rear crank section 8 are identical to a width of the intermediate crank section 7. In other words, a distance between: a boundary between the front journal 4 and the first outer crank arm 9 joined to the first outer balance weight 20; and a boundary between the first journal 12 and the first inner crank arm 10 joined to the first inner balance weight 21, is identical to a distance between: a boundary between the first journal 12 and the first intermediate crank arm 13; and a boundary between the second journal 19 and the second intermediate crank arm 14. Likewise, a distance between: a boundary between the rear journal 5 and the second outer crank arm 16 joined to the second outer balance weight 22; and a boundary between the second journal 19 and the second inner crank arm 17 joined to the second inner balance weight 23, is identical to the distance between: the boundary between the first journal 12 and the first intermediate crank arm 13; and the boundary between the second journal 19 and the second intermediate crank arm 14.

Thus, in the crankshaft 1, the first outer balance weight 20 and the first inner balance weight 21 are arranged in the front crank section 6, and the second outer balance weight 22 and the second inner balance weight 23 are arranged in the rear crank section 8. As described, in the first pair of the first outer balance weight 20 and the first inner balance weight 21, a mass of the first inner balance weight 21 located axially inner side is greater than a mass of the first outer balance weight 20. Likewise, in the second pair of the second outer balance weight 22 and the second inner balance weight 23, a mass of the second inner balance weight 23 located axially inner side is greater than a mass of the second outer balance weight 22. According to the exemplary embodiment of the present disclosure, therefore, vibrations on the crankshaft 1 may be damped effectively. To this end, an area of the first outer balance weight 20 along the plane perpendicular to the rotational axis is reduced smaller than an area of the first inner balance weight 21 along the plane perpendicular to the rotational axis without changing thicknesses of the first outer balance weight 20 and the first inner balance weight 21. Likewise, an area of the second outer balance weight 22 along the plane perpendicular to the rotational axis is reduced smaller than an area of the second inner balance weight 23 along the plane perpendicular to the rotational axis without changing thicknesses of the second outer balance weight 22 and the second inner balance weight 23. According to the exemplary embodiment of the present disclosure, therefore, each distance between the front journal 4 and the first journal 12, between the first journal 12 and the second journal 19, and between the second journal 19 and the rear journal 5 may be maintained to a designed distance without being changed. For this reason, it is not necessary to change a design of the crankcase to hold the crankshaft 1.

Instead, a mass of the first inner balance weight 21 may also be increased greater than a mass of the first outer balance weight 20 by increasing a radial length of the first inner balance weight 21 longer than a radial length of the first outer balance weight 20. In this case, a central angle of the first inner balance weight 21 may also be increased wider than a central angle of the first outer balance weight 20.

Likewise, a mass of the second inner balance weight 23 may also be increased greater than a mass of the second outer balance weight 22 by increasing a radial length of the second inner balance weight 23 longer than a radial length of the second outer balance weight 22. In this case, a central angle of the second inner balance weight 23 may also be increased wider than a central angle of the second outer balance weight 22.

A shape of each of the first outer balance weight 20, the first inner balance weight 21, the second outer balance weight 22, and the second inner balance weight 23 should not be limited to a sector form. For example, the first outer balance weight 20, the first inner balance weight 21, the second outer balance weight 22, and the second inner balance weight 23 may also be shaped individually into a rectangular form. In this case, masses of the first inner balance weight 21 and the second inner balance weight 23 may also be increased by adjusting e.g., lengths and widths thereof. For example, lengths of the first inner balance weight 21 and the second inner balance weight 23 between the rotational axis and their farthest portions from the rotational axis may be increased to increase their masses.

Here, it is to be noted that the present disclosure may also be applied to crankshafts having four or more crank sections. For example, the present disclosure may also be applied to a crankshaft employed in a straight-four engine.

As an option, in the intermediate crank section 7, balance weights may also be joined to the first intermediate crank arm 13 and the second intermediate crank arm 14. In this case, a mass of the first inner balance weight 21 may also be increased greater than a mass of the first outer balance weight 20, and a mass of the second inner balance weight 23 may also be increased greater than a mass of the second outer balance weight 22.

The crankshaft 1 is vibrated not only in a direction in which the crankshaft 1 is bent vertically but also in a direction in which the crankshaft 1 is bent horizontally. In order to effectively damp vibration on the crankshaft 1, the inventors of the present disclosure also conducted a simulation to find optimum rigidities of the first outer crank arm 9, the first inner crank arm 10, the first intermediate crank arm 13, the second intermediate crank arm 14, the second outer crank arm 16, and the second inner crank arm 17.

In the simulation, rigidities of the crank arms 9, 10, 13, 14, 17, and 18 were adjusted in patterns F to H shown in FIG. 4. Specifically, in the pattern F, rigidities of the crank arms 9, 10, 13, 14, 17, and 18 were adjusted to be equal to one another. In the pattern G, rigidities of the crank arms 9, 10, 13, 14, 17, and 18 were adjusted such that rigidities of the first outer crank arm 9 and the second outer crank arm 16 were increased higher than those in the pattern F, that rigidities of the first inner crank arm 10 and the second inner crank arm 17 were set to those in the pattern F, and that rigidities of the first intermediate crank arm 13 and the second intermediate crank arm 14 were reduced lower than those in the pattern F. In the pattern F, rigidities of the crank arms 9, 10, 13, 14, 17, and 18 were adjusted such that rigidities of the first outer crank arm 9, the first inner crank arm 10, the second inner crank arm 17, and the second outer crank arm 16 were increased higher than those in the pattern F, and that rigidities of the first intermediate crank arm 13 and the second intermediate crank arm 14 were reduced lower than those in the pattern F. In the simulation, rigidities of the crank arms 9, 10, 13, 14, 17, and 18 were adjusted by changing thicknesses of the joining sections 9a, 10a, 13a, 14a, 17a, and 18a.

The simulation is also conducted on the basis that the crankshaft 1 rotates at a same speed while maintaining an engine load to a constant value in all of the above-mentioned patterns. In the above-mentioned conditions, vibration levels of the front journal 4, the first journal 12, the second journal 19, and the rear journal 5 are simulated within a range of frequency between 600 Hz and 1600 Hz.

Simulated vibration levels in the patterns G and H compared to simulated vibration levels in the pattern F are shown in Table 1.

TABLE 3

| | Vibration Levels (Compared to the pattern F) | |
|---|---|---|
| Pattern | G | H |
| Front Journal | −0.46 | −0.55 |
| First Journal | −0.05 | −0.37 |
| Second Journal | 0 | −0.32 |
| Rear Journal | −0.71 | −1.00 |

Unit: dB

As can be seen from Table 3, the vibrations on the front journal 4, the first journal 12, the second journal 19, and the rear journal 5 can be reduced in both of the patterns G and H. That is, even if the rigidities of the first intermediate crank arm 13 and the second intermediate crank arm 14 are reduced, vibrations on the crankshaft 1 can be damped effectively by increasing the rigidities of the first outer crank arm 9, the first inner crank arm 10, the second outer crank arm 16, and the second inner crank arm 17 arranged axially outer sides of the first intermediate crank arm 13 and the second intermediate crank arm 14.

Especially, the vibrations on the crankshaft 1 can be damped most effectively by increasing the rigidities of the first outer crank arm 9 and the second outer crank arm 16 higher than the rigidities of the first inner crank arm 10, the first intermediate crank arm 13, the second intermediate crank arm 14, and the second inner crank arm 17.

Based on the simulated values in the patterns G and H, a load acted on the front journal 4 in the pattern G and a load acted on the front journal 4 in the pattern H were compared to a load acted on the front journal 4 in the pattern F. Specifically, average values of levels of loads acted on the front journal 4 in the reciprocating direction of the pistons (i.e., in the vertical direction) and in the direction perpendicular to the reciprocating direction of the pistons (i.e., in the horizontal direction) in the pattern G; and average values of levels of loads acted on the front journal 4 in the vertical direction and in the horizontal direction in the pattern H; were individually compared to average values of levels of loads acted on the front journal 4 in the vertical direction and in the horizontal direction in the pattern F. A comparison result is shown in Table 4.

TABLE 4

| | Load Levels (Compared to the pattern F) | |
|---|---|---|
| Pattern | G | H |
| Vertical Load | −1.24 | −1.43 |
| Horizontal Load | −2.63 | −3.16 |

Unit: dB

As can be seen from Table 4, the loads acted on the front journal 4 in both of the patterns G and H are smaller than the load acted on the front journal 4 in the pattern F. That is, the vibrations on the crankshaft 1 can be damped more effectively in the patterns G and H. As described, the vibrations on the crankshaft 1 can be damped most effectively by increasing the rigidities of the first outer crank arm 9 and the second outer crank arm 16 higher than the rigidities of the first inner crank arm 10, the first intermediate crank arm 13, the second intermediate crank arm 14, and the second inner crank arm 17.

According to the exemplary embodiment of the present disclosure, therefore, the rigidities (of the first joining section 9a and the second joining section 16a) of the first outer crank arm 9 and the second outer crank arm 16 may also be increased higher than the rigidities (of the third joining section 10a, the joining section 13a, the joining section 14a, and fourth joining section 17a) of the first inner crank arm 10, the first intermediate crank arm 13, the second intermediate crank arm 14, and the second inner crank arm 17, so as to damp vibrations on the crankshaft 1.

In this case, the rigidities of the first joining section 9a and the second joining section 16a are increased without changing thicknesses of the first outer balance weight 20 and the second outer balance weight 22. According to the exemplary embodiment of the present disclosure, therefore, positions of the front journal 4, the first journal 12, the rear journal 5, and the second journal 19 may be maintained to designed positions. For this reason, it is not necessary to change a design of the crankcase to hold the crankshaft 1.

Although the above exemplary embodiments of the present disclosure have been described, it will be understood by those skilled in the art that the present disclosure should not be limited to the described exemplary embodiments, and various changes and modifications can be made within the scope of the present disclosure. For example, rigidity of the first outer crank arm 9 may also be increased by forming a rib on a back surface opposite to a surface connected to the front crank pin 11. Likewise, rigidity of the second outer crank arm 16 may also be increased by forming a rib on a back surface opposite to a surface connected to the rear crank pin 18.

In addition, it is possible to damp vibrations on the crankshaft 1 only by increasing a mass of the first inner balance weight 21 greater than a mass of the first outer balance weight 20 and increasing a mass of the second inner balance weight 23 greater than a mass of the second outer balance weight 22, or only by increasing rigidities of the first outer crank arm 9 and the second outer crank arm 16 higher than rigidities of other crank arms. Instead, it is also possible to damp vibrations on the crankshaft 1 by increasing a mass of the first inner balance weight 21 greater than a mass of the first outer balance weight 20 and increasing a mass of the second inner balance weight 23 greater than a mass of the second outer balance weight 22, and by increasing rigidities of the first outer crank arm 9 and the second outer crank arm 16 higher than rigidities of other crank arms.

What is claimed is:

1. A crankshaft comprising:
a plurality of crank sections arranged along a rotational axis of the crankshaft including a first crank section located at one end of the crankshaft, a second crank section located at the other end of the crankshaft, and an intermediate crank section located between the first crank section and the second crank section,
wherein each of the crank sections comprises
a pair of crank arms being opposed to each other, and
a crank pin connecting radially outermost portions of the crank arms such that the crank section rotates around the rotational axis of the crankshaft extending parallel to a center axis of the crank pin,
the first crank section comprises a first pair of crank arms, a first crank pin connecting the first pair of crank arms, and a first pair of balance weights individually counteracting an inertial force acting on the first crank pin,
the first pair of crank arms includes a first outer crank arm located at an axially outer side, and a first inner crank arm located at an axially inner side,
the first pair of balance weights includes
a first outer balance weight joined to the first outer crank arm to be situated on an opposite side of the first outer crank arm across the rotational axis, and
a first inner balance weight joined to the first inner crank arm to be situated on an opposite side of the first inner crank arm across the rotational axis,
the second crank section comprises a second pair of crank arms, a second crank pin connecting the second pair of crank arms, and a second pair of balance weights individually counteracting an inertial force acting on the second crank pin,
the second pair of crank arms includes a second outer crank arm located at an axially outer side, and a second inner crank arm located at an axially inner side,
the second pair of balance weights includes
a second outer balance weight joined to the second outer crank arm to be situated on an opposite side of the second outer crank arm across the rotational axis, and
a second inner balance weight joined to the second inner crank arm to be situated on an opposite side of the second inner crank arm across the rotational axis,
the intermediate crank section comprises a pair of intermediate crank arms, and an intermediate crank pin connecting the intermediate crank arms, and
the first crank section and the second crank section are configured to satisfy of the following condition:
(1) that a mass of the first inner balance weight is greater than a mass of the first outer balance weight, and a mass of the second inner balance weight is greater than a mass of the second outer balance weight
wherein the first inner balance weight and the first outer balance weight are individually shaped into a plate shape, and
an area of the first outer balance weight along a plane perpendicular to the rotational axis is smaller than an area of the first inner balance weight along the plane perpendicular to the rotational axis.

2. The crankshaft as claimed in claim 1,
wherein the first inner balance weight and the first outer balance weight are individually shaped into a sector form, and
an arc length of the first outer balance weight in a rotational direction of the first crank section is shorter than an arc length of the first inner balance weight in the rotational direction of the first crank section.

3. The crankshaft as claimed in claim 2, wherein a central angle of the first inner balance weight is wider than a central angle of the first outer balance weight.

4. The crankshaft as claimed in claim 1, wherein a length of the first outer balance weight between the rotational axis and a farthest portion from the rotational axis is shorter than a length of the first inner balance weight between the rotational axis and a farthest portion from the rotational axis.

5. The crankshaft as claimed in claim 4,
wherein the first inner balance weight and the first outer balance weight are individually shaped into a sector form, and
a radius of the first inner balance weight is longer than a radius of the first outer balance weight.

6. The crankshaft as claimed in claim 1,
wherein the second inner balance weight and the second outer balance weight are individually shaped into a plate shape, and
an area of the second outer balance weight along a plane perpendicular to the rotational axis is smaller than an area of the second inner balance weight along the plane perpendicular to the rotational axis.

7. The crankshaft as claimed in claim 6,
wherein the second inner balance weight and the second outer balance weight are individually shaped into a sector form, and
an arc length of the second outer balance weight in a rotational direction of the second crank section is shorter than an arc length of the second inner balance weight in the rotational direction of the second crank section.

8. The crankshaft as claimed in claim 7, wherein a central angle of the second inner balance weight is wider than a central angle of the second outer balance weight.

9. The crankshaft as claimed in claim 6, wherein a length of the second outer balance weight between the rotational axis and a farthest portion from the rotational axis is shorter than a length of the second inner balance weight between the rotational axis and a farthest portion from the rotational axis.

10. The crankshaft as claimed in claim 9,
wherein the second inner balance weight and the second outer balance weight are individually shaped into a sector form, and
a radius of the second inner balance weight is longer than a radius of the second outer balance weight.

11. The crankshaft as claimed in claim 1, wherein widths of the first crank section, the second crank section, and the intermediate crank section in an axial direction are identical to one another.

12. A crankshaft comprising:
a plurality of crank sections arranged along a rotational axis of the crankshaft including a first crank section located at one end of the crankshaft, a second crank section located at the other end of the crankshaft, and an intermediate crank section located between the first crank section and the second crank section,
wherein each of the crank sections comprises
a pair of crank arms being opposed to each other, and
a crank pin connecting radially outermost portions of the crank arms such that the crank section rotates around the rotational axis of the crankshaft extending parallel to a center axis of the crank pin,
the first crank section comprises a first pair of crank arms, a first crank pin connecting the first pair of crank arms, and a first pair of balance weights individually counteracting an inertial force acting on the first crank pin,
the first pair of crank arms includes a first outer crank arm located at an axially outer side, and a first inner crank arm located at an axially inner side,
the first pair of balance weights includes
a first outer balance weight joined to the first outer crank arm to be situated on an opposite side of the first outer crank arm across the rotational axis, and
a first inner balance weight joined to the first inner crank arm to be situated on an opposite side of the first inner crank arm across the rotational axis,
the second crank section comprises a second pair of crank arms, a second crank pin connecting the second pair of crank arms, and a second pair of balance weights individually counteracting an inertial force acting on the second crank pin,
the second pair of crank arms includes a second outer crank arm located at an axially outer side, and a second inner crank arm located at an axially inner side,
the second pair of balance weights includes
a second outer balance weight joined to the second outer crank arm to be situated on an opposite side of the second outer crank arm across the rotational axis, and
a second inner balance weight joined to the second inner crank arm to be situated on an opposite side of the second inner crank arm across the rotational axis,
the intermediate crank section comprises a pair of intermediate crank arms, and an intermediate crank pin connecting the intermediate crank arms, and
the first crank section and the second crank section are configured to satisfy the following condition:
that a rigidity of a first joining section of the first outer crank arm to which the first crank pin is connected and a rigidity of a second joining section of the second outer crank arm to which the second crank pin is connected are higher than rigidities of joining sections of the intermediate crank arms to which the intermediate crank pin is connected,
wherein the rigidity of the first joining section of the first outer crank arm is higher than a rigidity of a third joining section of the first inner crank arm to which the first crank pin is connected, and
the rigidity of the second joining section of the second outer crank arm is higher than a rigidity of a fourth joining section of the second inner crank arm to which the second crank pin is connected.

13. The crankshaft as claimed in claim 12, wherein the rigidities of the third joining section and the fourth joining section are higher than the rigidities of the joining sections of the intermediate crank arms to which the intermediate crank pin is connected.

14. The crankshaft as claimed in claim 12, wherein thicknesses of the first joining section and the second joining section are thicker than thicknesses of the joining sections of the intermediate crank arms to which the intermediate crank pin is connected.

15. The crankshaft as claimed in claim 12, wherein the rigidity includes at least one of a rigidity of the crank arm in a vertical direction and a rigidity of the crank arm in a horizontal direction.

* * * * *